May 25, 1965  R. G. DAUDELIN  3,185,096
THRUST REVERSAL UNIT FOR ROCKET MOTOR
Filed Aug. 31, 1959
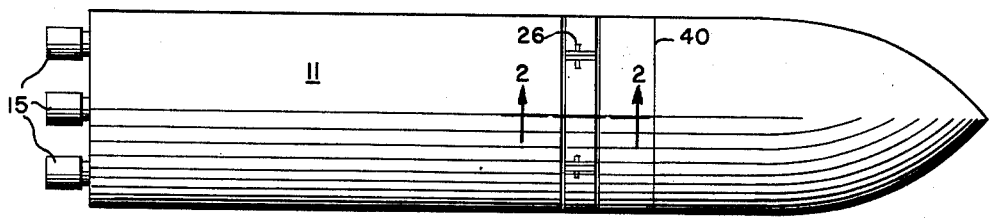
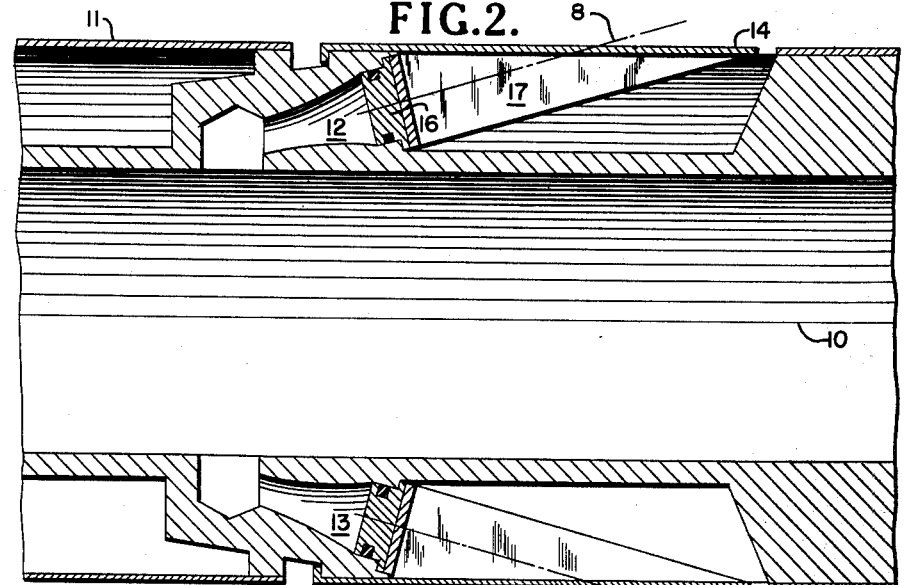
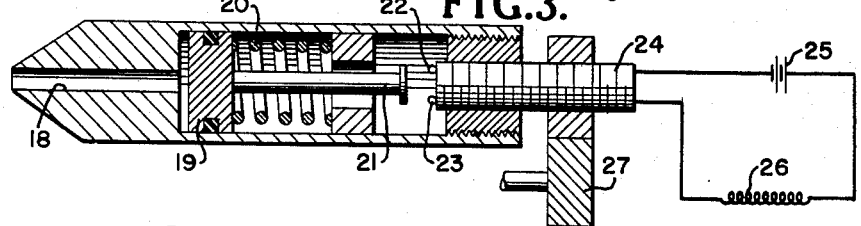
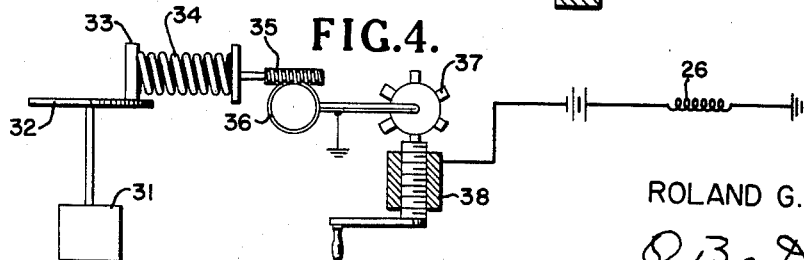
INVENTOR
ROLAND G. DAUDELIN
BY
ATTORNEYS.

United States Patent Office 3,185,096
Patented May 25, 1965

3,185,096
THRUST REVERSAL UNIT FOR ROCKET MOTOR
Roland G. Daudelin, Silver Spring, Md., assignor to the United States of America as represented by the Secretary of the Navy
Filed Aug. 31, 1959, Ser. No. 837,292
6 Claims. (Cl. 102—49)
(Granted under Title 35, U.S. Code (1952), sec. 266)

The invention described herein may be manufactured and used by or for the Government of the United States of America for governmental purposes without the payment of any royalties thereon or therefor.

This invention relates to rockets and more particularly to a new and improved rocket motor having a plurality of jets spaced around the rocket chamber for providing a reverse thrust.

An object of this invention is to provide an end burning rocket having an axial nozzle, and a plurality of reverse thrust peripheral nozzles with propellant gases from the same source of energy that supplies the axial nozzle, with means for automatically cutting on the supply of gases to the peripheral nozzles after a predetermined quantity of propellant has been consumed, thus insuring a time delay before the reverse peripheral nozzles can be energized.

A further object of this invention is to stop forward thrust of a rocket motor at any desired time and to provide a force to separate the rocket motor from the forward missile portion.

Another object of this invention is to provide a novel circuit dependent on the velocity of the rocket for opening the thrust reversal nozzles.

Another object of this invention is to provide a reverse thrust nozzle control so that the opening of one nozzle opens all the nozzles.

Another object of this invention is to provide a release mechanism directly related to the thrust of the rocket.

Still another object of this invention is to provide an initial thrust to the missile by use of a rocket motor, a means including reversal nozzles, for removing the rocket motor, thereby allowing the forward missile portion to follow a trajectory path to the target.

Other features of the invention will appear from the following description taken in conjunction with the accompanying drawings which illustrate diagrammatically and by way of example the preferred embodiments thereof, and in which:

FIG. 1 discloses a self-propelled projectile with the applicant's invention;

FIG. 2 is a sectional view of the device of FIG. 1 and shows the thrust reversing nozzles, plugs and segmented band;

FIG. 3 is a velocity sensing device called a pilot tube and discloses a circuit responsive to the acceleration of the rocket and having means capable of removing the nozzle clamp band; and FIG. 4 is an integrating accelerometer and is an alternative circuit for forming the same function as shown in the immediately previous figure.

The apparatus shown in the drawing in FIG. 2 is the after portion of an end burning type rocket, including a cylindrical motor tube 11 provided with a series of small nozzles 12 and 13 constructed on the periphery of the rocket motor 11. The axis of these small nozzles, as illustrated by 8, 9 are at an angle with the axis 10 of the rocket motor. The number of nozzles is such that the thrust developed by these small nozzles along the rocket motor axis will be greater than that developed by the main nozzle. These small nozzles are kept closed by a four segment clamp band 14 which is blown apart or released by explosive bolts illustrative by 26 in FIG. 3. The small nozzles are placed forward of the main nozzles 15 such that the grain will be required to burn a certain length of time before these small nozzles 12, 13, are exposed at which time the missile will have attained a sufficient velocity to carry it a distance such as will be safe from the launch point.

Clamp band 14 is connected to the nozzle plug 16 by means of a rib 17, shown in FIG. 2. The clamp band 14 is divided into four segments and these segments are held together by four explosive bolts 26 of FIG. 1 which are of the type well known in the art. Actuation of the explosive bolts allows the segmented clamp band to be pushed outward by the outward component of force exerted on the clamp band by the gas pressure in the small nozzles. The magnitude of this outward component of force is dependent on the angle of the small nozzle with the axis of the rocket motor. The utilization of a single 4 segment clamp band assures that the band will operate or be ejected even if only an exposive bolt is actuated. Therefore, all the small nozzles will function at the same time providing a relatively smooth deceleration for the rocket motor. The forward part of the rocket is released along line 40, by means well known in the art, simultaneously with the motor deceleration and follows a trajectory path to the target.

It should be noted that by placing of the small nozzles 12–13 forward of the main nozzles 15 in a rocket having end burning propellant gains that the rocket motor must burn a certain length of time and hence have a certain velocity before the small nozzles are exposed to the internal pressure. Therefore, even if the clamp band is broken or actuated accidently, the missile will travel a certain range before decelerating to provide a built in safety feature.

By varying the angle formed by the axis of the small nozzles with the axis of the rocket motor, the amount of deceleration will be varied. It will be understood that while the nozzles are shown mounted on the inside diameter of the rocket missile that by changing the missile configuration the small nozzles could be mounted on the outside diameter. Further the small nozzles do not need to be an integral part of the missile case but can be separate blocks welded to the case.

As is well known to the person skilled in the art, air pressure acting on an object exerts a force proportional to the velocity squared of the object traveling in the air. A missile having a given velocity at a given angle will travel a definite range depending on the shape of the object. Given a certain object fired at a definite angle of elevation, the object will have a certain reproducible range. Hence, if a rocket missile's thrust is terminated at a definite velocity a certain range will result (neglecting wind etc. which can be corrected by a computer).

FIG. 3 shows the preferred method of measuring velocity and terminating thrust when the velocity desired is reached thereby giving the desired range. The thrust termination is accomplished by the thrust reversal system recited above.

The device shown is usually mounted in the missile nose and senses the air pressure due to the velocity of the missile. The air pressure enters tube 18 and acts on the piston 19 forcing it against the spring 20. The further the piston has to travel the greater the force necessary to overcome the spring and hence the greater the velocity required. When the piston rod 21 does come into contact with the two terminals 22, 23 on the screw 24, a circuit is completed from the battery 25 thru explosive bolts 26, which fires the explosive bolts 26, or actuates a pressure switch, which in turn releases the four segmented band 14 normally holding closed the thrust reversal nozzles.

The range is selected by the velocity required for that specified distance. The set of gears 27 will position the screw in or out, as the case may be, determining the length of travel of the piston before making contact with the screw.

FIG. 4 is an integrating accelerometer and is the alternate method for measuring the velocity of the missile. In this figure the acceleration of the missile is measured and integrated over a period of time. When the integral shows the proper velocity the circuit is completed.

A constant speed motor 31 rotates a plate 32 at constant speed thereby setting up a time base. A disc 33 free to move from the center of the plate outward, compressing spring 34, is frictionally mounted on plate 32. The speed at which disc 33 will rotate depends upon its location relative to plate 32. For example, when the missile is at rest the disc 33 is medially located with respect to the plate 32 and therefore does not rotate. As the missile velocity increases disc 33 moves toward the outside edge of the constant speed plate by compressing spring 34, thereby increasing the rotational speed of the said disc. As the disc turns, it rotates a worm 35 which rotates a worm gear 36 which, in turn, rotates a grounded cam 37 having different length projections mounted thereon. The range of the missile being the velocity of the missile multiplied by the time. Therefore, the range is selected by means of screw 38 being turned in or out to meet the required cam projection. When the grounded cam 37 comes into contact with the screw 38, a circuit is completed which fires the explosive bolts 26 or actuates a pressure switch, which, in turn, releases the band holding closed the thrust reversal nozzles.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A thrust cancellation device in combination with a single rocket motor of the solid propellant type having a combustion chamber, a main exhaust nozzle communicating at its forward end with the combustion chamber and an open rear end to provide an exit for gases of propulsion, said device comprising a plurality of thrust reversing nozzles arranged on the periphery of the combustion chamber and longitudinally displaced from the thrust end of the rocket motor to prevent accidental actuation of said thrust reversing nozzles until the rocket reaches a safe distance from a launching site, a plurality of plugs respectively disposed in each of said reversing nozzles, a single four segmented clamp band for maintaining said plugs in all of said thrust reversing nozzles, explosive bolts for holding said segmented clamp band in place, an integrating accelerometer means located entirely in the rocket for determining when the rocket motor has attained a sufficient acceleration and for closing an electrical circuit during the acceleration period to said explosive bolts whereby at least one of the explosive bolts is fired releasing the band and simultaneously opening all of the thrust reversing nozzles.

2. A thrust cancellation device according to claim 1 wherein said integrating accelerometer comprises a constant speed motor with a circular disc plate attached to the shaft thereof, an acceleration responsive spring biased rotatable disc frictionally coupled to said disc plate, a worm shaft connected to said spring biased disc and rotatable therewith, a worm gear on a common shaft with a sprocket having projections of increasing lengths thereon, said worm gear, common shaft and sprocket being rotatable by said worm shaft, an adjustable screw connected to the electrical circuit and closely spaced with respect to said sprocket in such a manner that a selected one of the projections will make contact with said adjustable screw as the sprocket is rotated thereby closing the electrical circuit to said explosive bolts.

3. A thrust cancellation device in combination with a guided missile with a rocket motor of the solid propellant type having a combustion chamber, at least one main exhaust nozzle communicating at its forward end with the combustion chamber and an open rear end to provide an exit for gases of propulsion rearwardly of the motor, said device comprising a plurality of thrust reversing nozzles arranged on the periphery of the combustion chamber and longitudinally displaced from the main exhaust nozzle of the rocket motor to prevent actuation of said thrust reversing nozzles until the missile reaches a safe distance from launching site, a plurality of plugs respectively disposed in each of said reversing nozzles, a single four segmented clamp band for maintaining said plugs in their respective nozzles, explosive bolts for holding said segmented clamp band in position, an acceleration responsive switching means located in the missile for determining when the missile has attained sufficient acceleration for a trajectory and for closing an electric circuit during the acceleration period to said explosive bolts whereby at least one of the explosive bolts is fired releasing said single band and simultaneously opening all of the thrust reversing nozzles.

4. A thrust cancellation device according to claim 3 wherein said acceleration responsive switching means comprises means forming an aperture in the nose of said missile for providing a passageway for air pressure created by the acceleration of the missile, a pressure responsive spring biased piston located in a chamber connected to said passageway and responsive to the air pressure in said means forming an aperture, an adjustable screw having a pair of electrical contacts mounted thereon in close proximity to said piston, said pair of electrical contacts being included in a normally open electrical circuit including a source of power and said explosive bolts whereby when the air pressure reaches a predetermined value within said chamber said spring biased piston is moved into contact with said pair of electrical contacts completing the electrical circuit thereby actuating said explosive bolts.

5. In a rocket missile, the combination of a nose section, a motor section, and thrust reversal means on said motor section for stopping the forward thrust of the motor section of the missile, said thrust reversal means comprising a spring biased piston, means forming an aperture medially located with respect to said spring biased piston, said last-named means venting the piston to air pressure outside the nose section of the missile, control means for actuating said thrust reversal means, said control means including a circuit having a pair of normally open contacts mounted on an adjustable screw, the contacts mounted in closely spaced adjacency to the piston whereby when the air pressure has reached a predetermined value the piston will bridge the normally open contacts of the circuit to detonate a plurality of explosive bolts in said control means to actuate said thrust reversal means.

6. In a rocket missile, the combination of a nose section, a motor section, thrust reversal means on said motor section for stopping the forward thrust of the motor section of the missile, said thrust reversal means comprising a constant speed motor with a circular plate attached to the shaft thereof, a velocity responsive spring biased disc mounted on the plate surface and frictionally coupled thereto, control means connected to said disc including a worm, worm gear and a sprocket for actuating a normally open circuit in said control means, the sprocket having projections of increasing length on the periphery thereof, an adjustable screw closely spatially located with respect to the sprocket in such manner that a selected one of the projections makes contact with said adjustable screw as the sprocket rotates thereby closing the normally open circuit and actuating said thrust reversal means.

References Cited by the Examiner

UNITED STATES PATENTS

| | | | |
|---|---|---|---|
| 2,613,497 | 10/52 | MacDonald | 60—35.6 |
| 2,780,914 | 2/57 | Ring | 60—35.6 |
| 2,850,976 | 9/58 | Seifert | 102—50 X |
| 2,899,899 | 8/59 | Hirsch | 102—49 |
| 2,967,482 | 1/61 | Toomey | 102—49 |

SAMUEL FEINBERG, *Primary Examiner.*

ARTHUR M. HORTON, *Examiner.*